US012704092B2

(12) United States Patent
Miller et al.

(10) Patent No.: US 12,704,092 B2
(45) Date of Patent: Aug. 11, 2026

(54) GAS TURBINE ENGINE WITH HEAT EXCHANGER

(71) Applicant: General Electric Company, Schenectady, NY (US)

(72) Inventors: Brandon Wayne Miller, Liberty Township, OH (US); Andrew Hudecki, Evendale, OH (US); Eric Barre, Cincinnati, OH (US); Andrew J. Hank, Maineville, OH (US); Kirk Douglas Gallier, Liberty Township, OH (US)

(73) Assignee: General Electric Company, Evendale, OH (US)

(*) Notice: Subject to any disclaimer, the term of this patent is extended or adjusted under 35 U.S.C. 154(b) by 147 days.

(21) Appl. No.: 18/746,121

(22) Filed: Jun. 18, 2024

(65) Prior Publication Data

US 2026/0049574 A1 Feb. 19, 2026

(51) Int. Cl.
*F02C 7/14* (2006.01)

(52) U.S. Cl.
CPC .......... *F02C 7/14* (2013.01); *F05D 2260/213* (2013.01)

(58) Field of Classification Search
None
See application file for complete search history.

(56) References Cited

U.S. PATENT DOCUMENTS 1,963,906 A 6/1934 Jaffe
2,181,927 A 12/1939 Townsend
2,343,542 A 3/1944 Faunce
2,479,071 A 8/1949 Henstridge
2,872,165 A 2/1959 Wennerberg
2,939,686 A 6/1960 Wildermuth
3,072,225 A 1/1963 Cremer et al.
3,161,234 A 12/1964 Rannenberg
3,334,399 A 8/1967 Teeguarden
3,528,250 A 9/1970 Johnson
3,638,428 A 2/1972 Shipley et al.
(Continued)

FOREIGN PATENT DOCUMENTS

CN 105508054 A 4/2016
DE 102005049067 A1 4/2007
(Continued)

OTHER PUBLICATIONS

Co-Pending U.S. Appl. No. 18/071,722, filed Nov. 30, 2022.
(Continued)

*Primary Examiner* — David P. Olynick
(74) *Attorney, Agent, or Firm* — Dority & Manning, P.A.

(57) ABSTRACT

A gas turbine engine includes a fan, a turbomachine comprising a compressor section, a combustion section, and a turbine section arranged in serial flow order and defining in part a working gas flowpath, the compressor section including a frame and defining a cavity forward of the frame, the compressor section further comprising a booster disposed in the working gas flowpath including a vane in fluid communication with the working gas flowpath and the cavity, the gas turbine engine defining a bypass passage over the turbomachine, and a heat exchanger disposed at least partially in the cavity, wherein the heat exchanger is in fluid communication with the booster in the working gas flowpath and is in fluid communication with the bypass passage.

20 Claims, 5 Drawing Sheets

(56) References Cited

U.S. PATENT DOCUMENTS 3,643,733 A 2/1972 Hall et al.
3,735,588 A 5/1973 Moskowitz et al.
3,757,855 A 9/1973 Kun et al.
3,807,496 A 4/1974 Stadmark
3,841,271 A 10/1974 Harris, Jr. et al.
3,885,942 A 5/1975 Moore
3,948,317 A 4/1976 Moore
4,109,710 A 8/1978 Forster et al.
4,137,705 A 2/1979 Andersen et al.
4,211,208 A 7/1980 Lindner
4,216,937 A 8/1980 Bridgnell et al.
4,246,959 A 1/1981 Byrne
4,253,520 A 3/1981 Friedericy et al.
4,275,785 A 6/1981 Kerivan
4,328,860 A 5/1982 Hoffmuller
4,446,696 A 5/1984 Sargisson et al.
4,470,455 A 9/1984 Sacca
4,503,908 A 3/1985 Rosman et al.
4,596,285 A 6/1986 Dinulescu
4,638,857 A 1/1987 Fournier
4,676,303 A 6/1987 Barroyer et al.
4,676,305 A 6/1987 Doty
4,698,964 A 10/1987 Glancy
4,785,879 A 11/1988 Longsworth et al.
4,815,532 A 3/1989 Sasaki et al.
4,854,380 A 8/1989 Yoshida et al.
4,880,055 A 11/1989 Niggemann et al.
5,033,542 A 7/1991 Jabs
5,074,118 A 12/1991 Kepler
5,123,242 A 6/1992 Miller
5,243,815 A 9/1993 Maier et al.
5,251,692 A 10/1993 Haussmann
5,269,135 A 12/1993 Vermejan et al.
5,279,109 A 1/1994 Liu et al.
5,363,654 A 11/1994 Lee
5,511,613 A 4/1996 Mohn et al.
5,544,700 A 8/1996 Shagoury
5,695,007 A 12/1997 Fauconnier et al.
5,775,412 A 7/1998 Montestruc, III et al.
5,810,077 A 9/1998 Nakamura et al.
5,820,654 A 10/1998 Gottzman et al.
5,987,877 A 11/1999 Steiner
6,422,306 B1 7/2002 Tomlinson et al.
6,474,408 B1 11/2002 Yeh et al.
6,584,778 B1 7/2003 Griffiths et al.
6,945,320 B2 9/2005 Harvard, Jr. et al.
7,185,483 B2 3/2007 Czachor
7,220,392 B2 5/2007 Rong et al.
7,255,159 B2 8/2007 Sagasser et al.
7,343,965 B2 3/2008 Memory et al.
7,377,100 B2 5/2008 Bruno et al.
7,575,793 B2 8/2009 Aniolek et al.
7,650,935 B2 1/2010 Demuth et al.
7,779,898 B2 8/2010 Morrison et al.
7,784,528 B2 8/2010 Ottow et al.
7,823,374 B2 11/2010 Venkataramani et al.
7,845,159 B2 12/2010 Venkataramani et al.
7,861,512 B2 1/2011 Olver et al.
7,866,377 B2 1/2011 Slaughter
7,900,437 B2 3/2011 Venkataramani et al.
7,966,831 B2 6/2011 Kraft et al.
8,256,202 B1 9/2012 Paulino
8,266,888 B2 9/2012 Liu
8,266,889 B2 9/2012 Coffinberry
8,353,330 B2 1/2013 Lim et al.
8,381,803 B2 2/2013 Kim et al.
8,522,521 B2 9/2013 Dyer
8,596,076 B1 12/2013 Gritton et al.
8,708,036 B2 4/2014 Ikeda
8,826,970 B2 9/2014 Shiraichi et al.
9,109,514 B2 8/2015 Cheong
9,127,598 B2 9/2015 Snook et al.
9,249,730 B2 2/2016 Bourassa et al.
9,599,379 B2 3/2017 Ha et al.
9,623,354 B2 4/2017 Kumar et al.
9,752,835 B2 9/2017 Waldman et al.
9,777,963 B2 10/2017 Martinez et al.
9,835,380 B2 12/2017 Kupiszewski et al.
9,932,905 B2 4/2018 Suciu et al.
9,982,598 B2 5/2018 Pritchard, Jr. et al.
10,006,369 B2 6/2018 Kupiszewski
10,107,200 B2 10/2018 Miller et al.
10,119,466 B2 11/2018 Schwarz et al.
10,175,003 B2 1/2019 Sennoun et al.
10,208,676 B2 2/2019 Johnson et al.
10,247,324 B2 4/2019 Magee
10,287,992 B2 5/2019 Tan et al.
10,378,835 B2 8/2019 Kenworthy et al.
10,486,816 B2 11/2019 Army et al.
10,502,502 B2 12/2019 Sennoun et al.
10,590,856 B2 3/2020 Howarth
10,634,054 B2 4/2020 Schmitz
10,670,349 B2 6/2020 Wilson et al.
10,794,281 B2 10/2020 Nestico et al.
10,794,288 B2 10/2020 Schwarz et al.
10,821,509 B2 11/2020 Manteiga et al.
10,830,179 B2 11/2020 Hatim
10,830,540 B2 11/2020 Sennoun et al.
10,934,939 B2 3/2021 Miller et al.
11,060,462 B2 7/2021 Fert et al.
11,073,090 B2 7/2021 Nestico et al.
11,377,975 B2 7/2022 Elbaz et al.
11,572,827 B1 2/2023 Khalid et al.
11,608,743 B1 3/2023 Tweedt et al.
11,655,767 B2 5/2023 Hrubec et al.
2002/0005275 A1 1/2002 O'Donnell et al.
2003/0033815 A1* 2/2003 Proctor .................... F02C 6/08 60/785
2003/0131978 A1 7/2003 Nakano
2003/0159807 A1 8/2003 Ayres et al.
2004/0069470 A1 4/2004 Gorbulsky
2005/0150970 A1 7/2005 Beutin et al.
2007/0240865 A1 10/2007 Zhang et al.
2008/0014528 A1 1/2008 Bailey et al.
2008/0095611 A1 4/2008 Storage et al.
2008/0149313 A1 6/2008 Slaughter
2009/0000306 A1* 1/2009 Damle ..................... F02C 6/08 60/785
2009/0019858 A1* 1/2009 Roberge ................. F02C 3/073 60/785
2009/0260786 A1 10/2009 Palanchon
2010/0012289 A1 1/2010 Haussmann
2010/0077794 A1 4/2010 Higashiyama et al.
2010/0239793 A1 9/2010 Andrews et al.
2011/0024093 A1 2/2011 Shiraichi et al.
2011/0056652 A1 3/2011 Neher et al.
2011/0180242 A1 7/2011 Urata et al.
2012/0074150 A1 3/2012 Wortmann et al.
2012/0141851 A1 6/2012 Hou et al.
2012/0180478 A1 7/2012 Johnson et al.
2012/0279242 A1 11/2012 Seybold et al.
2012/0312502 A1 12/2012 Metni et al.
2013/0020047 A1 1/2013 Army, Jr. et al.
2013/0075054 A1 3/2013 Fox et al.
2013/0140010 A1 6/2013 Parfenov
2013/0152989 A1 6/2013 Krinn et al.
2013/0180696 A1 7/2013 Magee et al.
2013/0236299 A1 9/2013 Kington et al.
2014/0027099 A1 1/2014 Sispera et al.
2014/0034028 A1 2/2014 Zhang et al.
2014/0116664 A1 5/2014 Landre
2014/0150735 A1 6/2014 Caruzzi et al.
2014/0154548 A1 6/2014 Dillmann et al.
2014/0166236 A1 6/2014 Tan et al.
2014/0208768 A1 7/2014 Bacic
2014/0328964 A1 11/2014 Mark et al.
2014/0360698 A1* 12/2014 Waldman ................. F28F 1/08 165/81
2015/0027669 A1 1/2015 Kokas et al.
2015/0053380 A1 2/2015 Army, Jr. et al.
2015/0101334 A1 4/2015 Bond et al.
2015/0114611 A1 4/2015 Morris et al.
2015/0129184 A1 5/2015 Alhazmy
2015/0168080 A1 6/2015 Honma et al.

(56) References Cited

U.S. PATENT DOCUMENTS

| | | | | |
|---|---|---|---|---|
| 2015/0176924 | A1 | 6/2015 | Hu et al. | |
| 2015/0192370 | A1 | 7/2015 | Suzuki et al. | |
| 2015/0241142 | A1 | 8/2015 | Vallee et al. | |
| 2015/0377135 | A1 | 12/2015 | Kupiszewski | |
| 2015/0377562 | A1 | 12/2015 | Buckrell et al. | |
| 2016/0010863 | A1 | 1/2016 | Ott et al. | |
| 2016/0108814 | A1 | 4/2016 | Schmitz | |
| 2016/0108815 | A1 | 4/2016 | Schmitz et al. | |
| 2016/0109130 | A1 | 4/2016 | Stastny et al. | |
| 2016/0116218 | A1 | 4/2016 | Shedd et al. | |
| 2016/0116222 | A1 | 4/2016 | Shedd et al. | |
| 2016/0131432 | A1 | 5/2016 | Neumann et al. | |
| 2016/0151860 | A1 | 6/2016 | Engeli et al. | |
| 2016/0175934 | A1 | 6/2016 | Lacy et al. | |
| 2016/0201998 | A1 | 7/2016 | Kennedy et al. | |
| 2016/0202003 | A1 | 7/2016 | Gerstler et al. | |
| 2016/0230595 | A1* | 8/2016 | Wong | F28F 3/04 |
| 2016/0265850 | A1 | 9/2016 | Kupiszewski et al. | |
| 2016/0305713 | A1 | 10/2016 | Grande Fernandez et al. | |
| 2016/0363387 | A1 | 12/2016 | Stapleton | |
| 2017/0205149 | A1 | 7/2017 | Herring et al. | |
| 2018/0038243 | A1 | 2/2018 | Rambo et al. | |
| 2018/0244127 | A1 | 8/2018 | Sennoun et al. | |
| 2019/0072035 | A1 | 3/2019 | Peace et al. | |
| 2019/0120562 | A1 | 4/2019 | Fuller | |
| 2019/0128189 | A1* | 5/2019 | Rambo | F02K 3/115 |
| 2021/0025288 | A1 | 1/2021 | Bordoni et al. | |
| 2021/0108597 | A1 | 4/2021 | Ostdiek et al. | |
| 2021/0269168 | A1 | 9/2021 | Shaner et al. | |
| 2021/0363923 | A1 | 11/2021 | Zysman et al. | |
| 2022/0252008 | A1 | 8/2022 | Sibbach et al. | |
| 2023/0143283 | A1* | 5/2023 | Sharma | F01D 11/24 415/173.2 |
| 2023/0220815 | A1 | 7/2023 | Ostdiek et al. | |

FOREIGN PATENT DOCUMENTS

| | | | |
|---|---|---|---|
| EP | 0777094 | A2 | 6/1997 |
| EP | 1098156 | A1 | 5/2001 |
| EP | 2088371 | A2 | 8/2009 |
| GB | 400557 | A | 10/1933 |
| GB | 2217828 | A | 11/1989 |
| JP | H11325753 | A | 11/1999 |
| JP | 2001041674 | A | 2/2001 |
| JP | 2004037020 | A | 2/2004 |
| JP | 2006002622 | A | 1/2006 |
| JP | 2019065834 | A | 4/2019 |
| RU | 2535187 | C1 | 12/2014 |

OTHER PUBLICATIONS

Co-Pending U.S. Appl. No. 18/071,743, filed Nov. 30, 2022

Co-Pending U.S. Appl. No. 18/349,395, filed Jul. 10, 2023.

Naderi et al., Design and Performance Characterization of a Micro-pin-fin sCO2 Recuperator, Supercritical CO2 Power Cycles Symposium, Mar. 29, 2018, Pittsburg, 20 Pages. http://sco2symposium.com/papers2018/heat-exchangers/159_Pres.pdf.

* cited by examiner

GAS TURBINE ENGINE WITH HEAT EXCHANGER

FIELD

The present disclosure relates to a gas turbine engine with a heat exchanger.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly, and the fan assembly may be enclosed by an outer nacelle. The outer nacelle may define a bypass passage with the turbomachine.

Generally, improvements to a turbofan engine in the fields of thermal management and aerodynamics would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
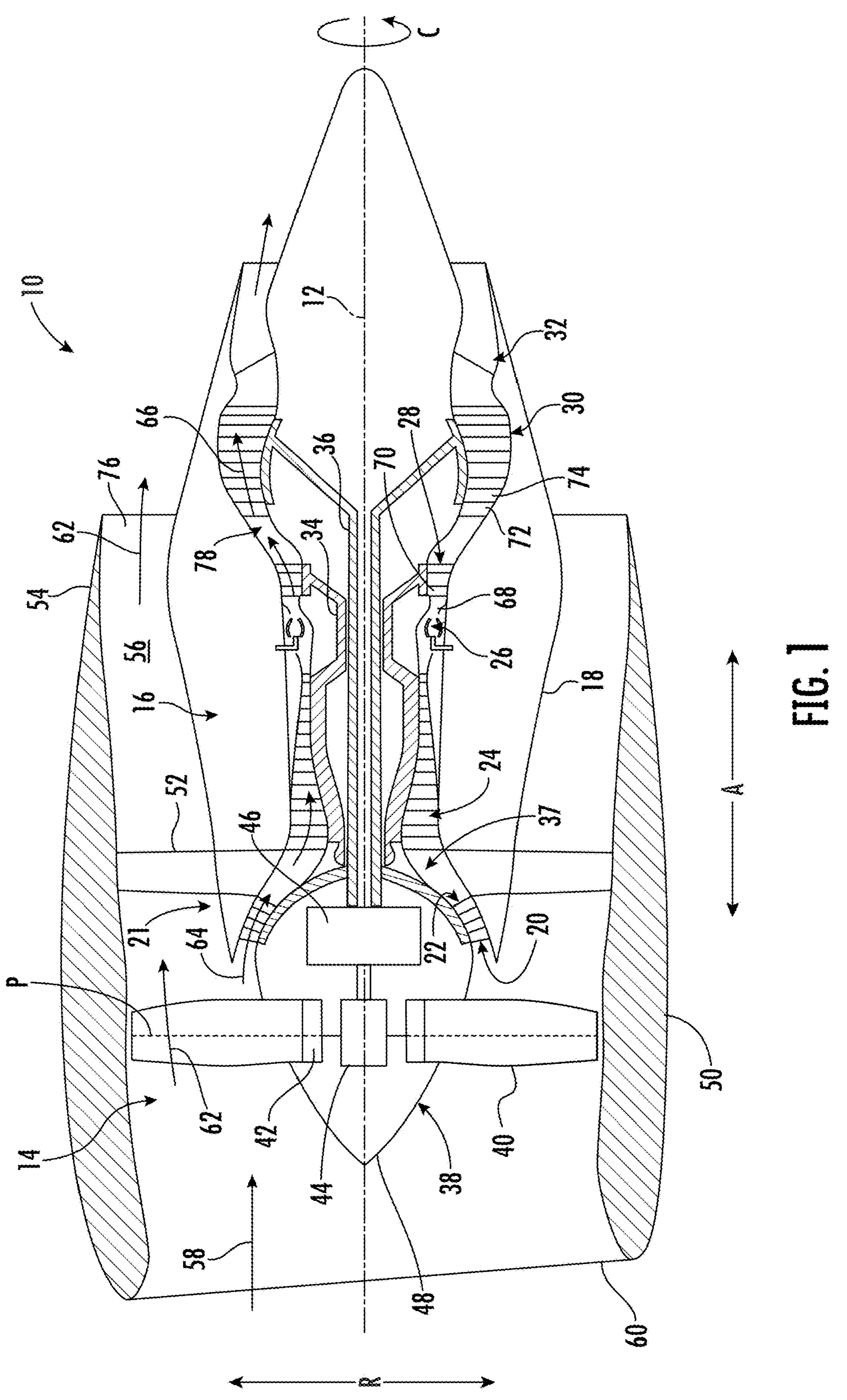
FIG. 1 is a cross-sectional view of a gas turbine engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The singular forms “a”, “an”, and “the” include plural references unless the context clearly dictates otherwise.

The terms “forward” and “aft” refer to relative positions within a gas turbine engine or vehicle and are based on a normal operational attitude of the gas turbine engine or vehicle. More particularly, forward and aft are used herein with reference to a direction of travel of the vehicle and a direction of propulsive thrust of the gas turbine engine.

The terms “upstream” and “downstream” refer to the relative direction with respect to fluid flow in a fluid pathway. For example, “upstream” refers to the direction from which fluid flows, and “downstream” refers to the direction to which the fluid flows.

As used herein, the terms “first,” “second,” “third,” and other ordinals are used to distinguish one component from another and are not intended to signify location or importance of the individual components.

The present disclosure is generally related to a heat exchanger assembly for a gas turbine engine. As design criteria for turbofan engines drives operating conditions to higher pressures and temperatures, it has been recognized that increased cooling capacity would be welcomed. Certain gas turbine engines bleed air from, e.g., a high pressure compressor, and use the bleed air to cool various accessory systems of the turbofan engine. However, such a configuration may result in inefficiencies as the air bled from the high pressure compressor undergoes a relatively high amount of work, and further is generally at an elevated temperature.

Accordingly, in one exemplary aspect, a gas turbine engine is provided having a turbomachine that defines a cavity having a cavity inlet in airflow communication with a working gas flowpath of the turbomachine at a location upstream of a compressor section and a cavity outlet in airflow communication with a bypass passage. A heat exchanger assembly is provided in the cavity such a heat exchanger is in thermal communication with an airflow through the cavity provided by an interstage bleed from a booster. The heat exchanger may be utilized to cool one or more accessory systems of the gas turbine engine.

In such an exemplary aspect, the airflow provided to the heat exchanger from the interstage bleed may be relatively cool and may be provided from a location upstream of a significant amount of compression (which would result in lost work). Utilizing the cool air to cool the accessory systems improves operation of the gas turbine engine with few additional components.

Referring now to the drawings, wherein identical numerals indicate the same elements throughout the figures, FIG. 1 is a cross-sectional view of a gas turbine engine in accordance with an exemplary embodiment of the present disclosure. More particularly, for the embodiment of FIG. 1, the gas turbine engine is an aeronautical, turbofan jet engine, referred to herein as “turbofan engine 10.” The turbofan engine 10 is configured to be mounted to an aircraft, such as in an under-wing configuration or a tail-mounted configuration. As shown in FIG. 1, the turbofan engine 10 defines an axial direction A (extending parallel to a longitudinal centerline provided for reference), a radial direction R, and a circumferential direction (e.g., a direction extending about the axial direction A). The longitudinal centerline 12 defines a longitudinal axis of the turbofan engine 10. In general, the turbofan engine 10 includes a fan section 14 and a turbomachine 16 disposed downstream from the fan section 14 (the turbomachine 16 sometimes also, or alternatively, referred to as a “core turbine engine”).

The exemplary turbomachine 16 depicted generally includes a substantially tubular outer casing 18 that defines an annular inlet 20. The outer casing 18 encases, in serial flow relationship, a compressor section 21 including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft drivingly connects the HP turbine 28 to the HP compressor 24. A low pressure (LP) shaft 36 drivingly connects the LP turbine 30 to the LP compressor 22. The compressor section 21, combustion section 26, turbine section, and jet exhaust nozzle section 32 are arranged in serial flow order and together define a working gas flowpath 37 through the turbomachine 16. It is also contemplated that the present disclosure is compatible with an engine having an intermediate pressure turbine, e.g., an engine having three spools.

Referring still to the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. The fan blades 40, disk 42, and actuation member 44 are together rotatable about the longitudinal centerline 12 by the LP shaft 36 across a power gearbox 46. The power gearbox 46 includes a plurality of gears for stepping down the rotational speed of the LP shaft 36 to a more efficient rotational fan speed. Accordingly, for the embodiment depicted, the turbomachine 16 is operably coupled to the fan 38 through the power gearbox 46.

Referring still to the exemplary embodiment of FIG. 1, the disk 42 is covered by a rotatable front nacelle or hub 48 aerodynamically contoured to promote an airflow through the plurality of fan blades 40. Additionally, the exemplary fan section 14 includes an annular fan casing or outer nacelle 50 that at least partially (and for the embodiment depicted, circumferentially) surrounds the fan 38 and at least a portion of the turbomachine 16.

More specifically, the outer nacelle 50 is supported relative to the turbomachine 16 by a plurality of circumferentially spaced outlet guide vanes 52, and a downstream section 54 of the outer nacelle 50 extends over an outer portion of the turbomachine 16 so as to define a bypass passage 56 therebetween. The outer nacelle 50 includes an inlet 60 at a leading edge of the outer nacelle 50.

During operation of the turbofan engine 10, a volume of air 58 enters the turbofan engine 10 through the inlet 60 of the outer nacelle 50, the fan section 14, or both. As the volume of air 58 passes cross the fan blades 40, a first portion 62 of the air 58 is directed or routed into the bypass passage 56, and a second portion 64 of the air 58 is directed or routed into the working gas flowpath 37. The pressure of the second portion 64 of air is then increased as it is routed through the HP compressor 24 and into the combustion section 26, where it is mixed with fuel and burned to provide combustion gases 66. The combustion gases 66 are routed from the combustion section 26 through the HP turbine 28. In the HP turbine 28, a portion of energy (such as thermal energy, kinetic energy, or both) from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of energy (such as thermal energy, kinetic energy, or both) is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22, rotation of the fan 38, or both.

The combustion gases 66 are subsequently routed through the jet exhaust nozzle section 32 of the turbomachine 16 to provide propulsive thrust. Simultaneously, the pressure of the first portion 62 is substantially increased as the first portion 62 is routed through the bypass passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

In some exemplary embodiments, the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least 20,000 pounds of thrust, such as at least about 25,000, 30,000, and up to, e.g., 150,000 pounds of thrust. Accordingly, the turbofan engine 10 may be referred to as a relatively large power class gas turbine engine.

Moreover, the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., the power gearbox 46) driving the fan, may include any other suitable number or arrangement of shafts, spools, compressors, turbines, etc. Further, although a turbofan engine is depicted in FIG. 1, in other exemplary embodiments, aspects of the present disclosure may be incorporated into any other suitable gas turbine engine, such as a turboprop engine, turboshaft engine, etc.

Figure 2:
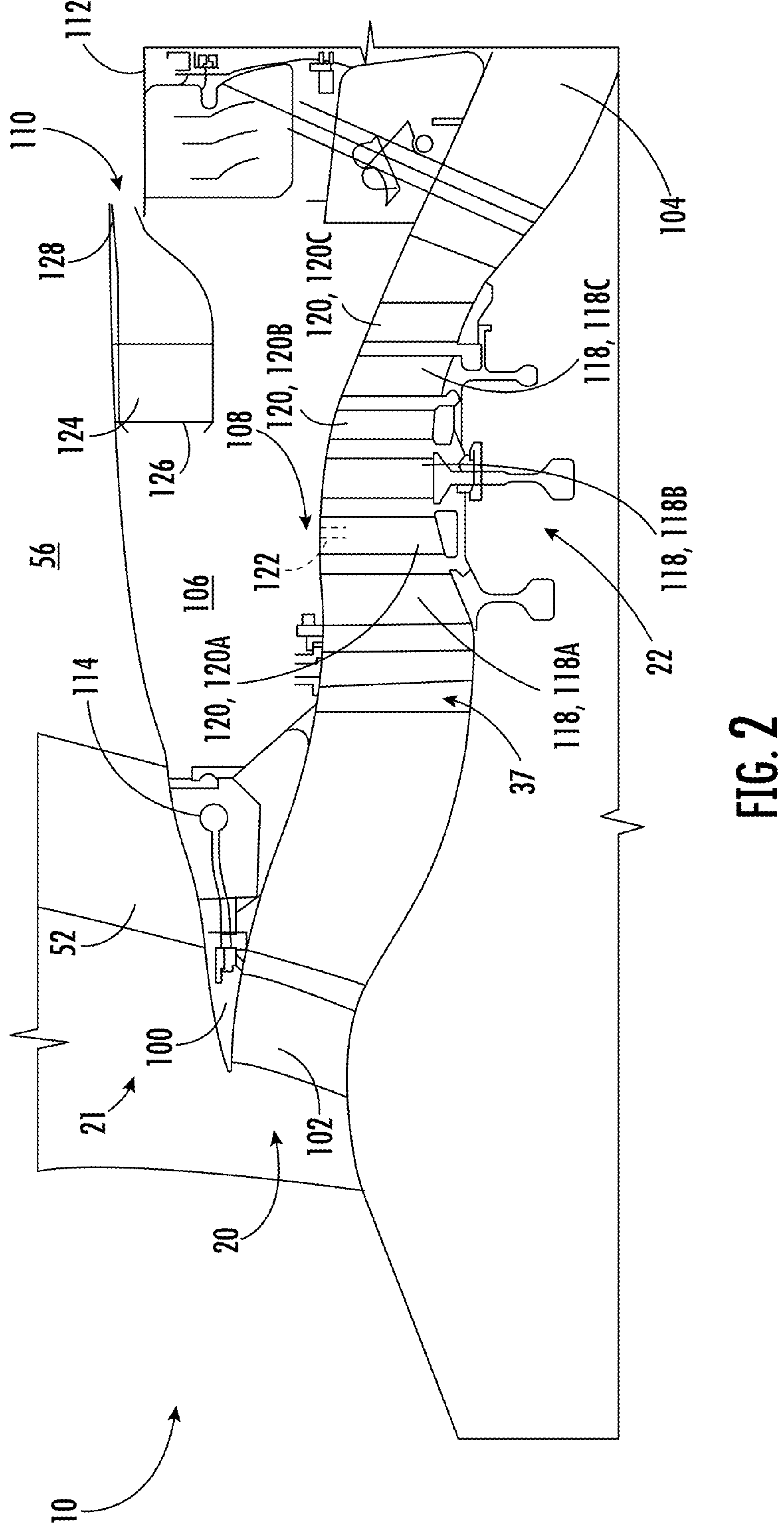
FIG. 2 is a schematic view of a turbomachine of the gas turbine engine of FIG. 1.

Referring now to FIG. 2, a close-up, schematic view is depicted of a portion of the turbofan engine 10 of FIG. 1. In particular, the view of FIG. 2 is a close-up of the turbomachine 16 of FIG. 1, depicting the annular inlet 20, the compressor section 21 including the LP compressor 22 and the HP compressor 24, the LP shaft 36, and the power gearbox 46. Further, the outer casing 18 of the turbomachine 16 is depicted extending around at least a portion of the compressor section 21, with the bypass passage 56 defined in part thereby.

As will be appreciated from the view of FIG. 2, the turbomachine 16 further includes a frame 100. The frame 100 includes a strut 102 extending through the working gas flowpath 37 at a location upstream of the LP compressor 22 and downstream of the annular inlet 20 and a strut 104 extending through the working gas flowpath 37 at a location downstream of the LP compressor 22 and upstream of the HP compressor 24. The frame 100 may provide structural support to various components of the turbofan engine 10.

The frame 100 defines a cavity 106 outward in the radial direction R from the LP compressor 22. The cavity 106 includes a cavity inlet 108 that is in fluid communication with the working gas flowpath 37 and a cavity outlet 110 that is in fluid communication with the bypass passage 56. Cool air from the working gas flowpath 37 can flow in through the cavity inlet 108 into the cavity 106 and out through the cavity outlet 110 to the bypass passage 56.

The turbomachine 16 includes a core cowl 112. The core cowl 112 is a portion of the turbomachine 16 that encloses a core stream (not shown). The core cowl 112 is aft of the cavity 106 in the axial direction A.

The turbomachine 16 may include a de-icer 114 that is disposed in the cavity. The de-icer 114 is a device that melts ice that accumulates on the frame 100. For example, the de-icer 114 may include a heater that radiates heat into the cavity 106 and is absorbed by the frame 100. This absorbed heat melts the accumulated ice on the frame 100.

The turbofan engine 10 includes a booster 116. The booster 116 provides additional power to air in the working gas flowpath 37 and provides air to the cavity 106. In general, the booster 116 increases one or more of a speed, a pressure, or a temperature of the air in the working gas flowpath 37. The booster 116 thus "boosts" the air toward the HP compressor 24.

The booster 116 is a multi-stage booster 116 including a plurality of booster rotor blades 118. More specifically, the booster 116 includes the LP compressor 22, which includes a first booster rotor blade 118A, a second booster rotor blade 118B, and a third booster rotor blade 118C (collectively, "booster rotor blades 118"). Each of the booster rotor blades 118 provides additional power to the air in the working gas flowpath 37, increasing a temperature, a pressure, or both of the air.

The booster 116 includes at least one vane 120. The vane 120 guides air boosted by one of the booster rotor blades through the booster 116. The booster 116 of FIG. 2 includes a first vane 120A, a second vane 120B, and a third vane 120C (collectively, "vanes 120"). The first vane 120A, which is disposed between the first booster rotor blade 118A and the second booster rotor blade 118B, defines an opening 122 fluidly connecting the working gas flowpath 37 to the cavity inlet 108. The first vane 120A directs air boosted by the first booster rotor blade 118A into the cavity 106. The position of the opening 122 acts as an interstage bleed for the cavity 106. That is, each of the booster rotor blades 118 and vanes 120 form a "stage" of air compression of the booster 116. Because the opening 122 is disposed between the first booster rotor blade 118A and the second booster rotor blade 118B, the opening 122 is disposed between two different stages of compression. Bleeding air through the opening 122 into the cavity 106 is an "interstage bleed." By placing the cavity inlet 108 and the opening 122 proximate to the first vane 120A for an interstage bleed, the air in the working gas flowpath 37 is boosted to more readily flow into the cavity 106 but is not overly heated, which allows the boosted air to be used for cooling purposes.

The turbofan engine 10 includes a heat exchanger 124 disposed in the cavity 106. The heat exchanger 124 includes an inlet 126 and an exit 128. The inlet 126 is in fluid communication with the cavity inlet 108 to receive air from the working gas flowpath 37, and the exit 128 is in fluid communication with the cavity outlet 110 to expel air to the bypass passage 56. More specifically, the inlet 126 is in fluid communication with the LP compressor 22 to receive air compressed by the booster 116. The heat exchanger 124 uses the cool air in the cavity 106 to extract heat from other components of the turbofan engine 10, including one or more accessory systems including an oil lubrication system, a fuel delivery system, a cooled cooling air (CCA) system, or an engine controller cooling system. Then, the heat exchanger 124 expels the heated air into the bypass passage 56. The heat exchanger 124 may be a suitable type, such as an air-cooled oil cooler or a variable frequency generator air-cooled oil cooler.

The heat exchanger 124 is disposed in the cavity 106 to receive air from the booster 116. Specifically, the heat exchanger 124 is disposed inward of the bypass passage 56 in the radial direction R, outward of the booster 116 in the radial direction R, aft of the outlet guide vane in the axial direction A, and forward of the core cowl 112 in the axial direction A. The specific position of the heat exchanger 124 allows for air from the working gas flowpath 37, boosted by the booster 116, to cool components with the heat exchanger 124 and then to be expelled to the bypass passage 56. Such utilization of the boosted air from the working gas flowpath 37 improves cooling of the components, and thus improves operation of the turbofan engine 10 compared to a configuration where the heat exchanger 124 either receives air prior to the booster 116 (which may have low pressure to drive air to the heat exchanger) or after the booster 116 (which may be too hot for cooling purposes).

Figure 3:
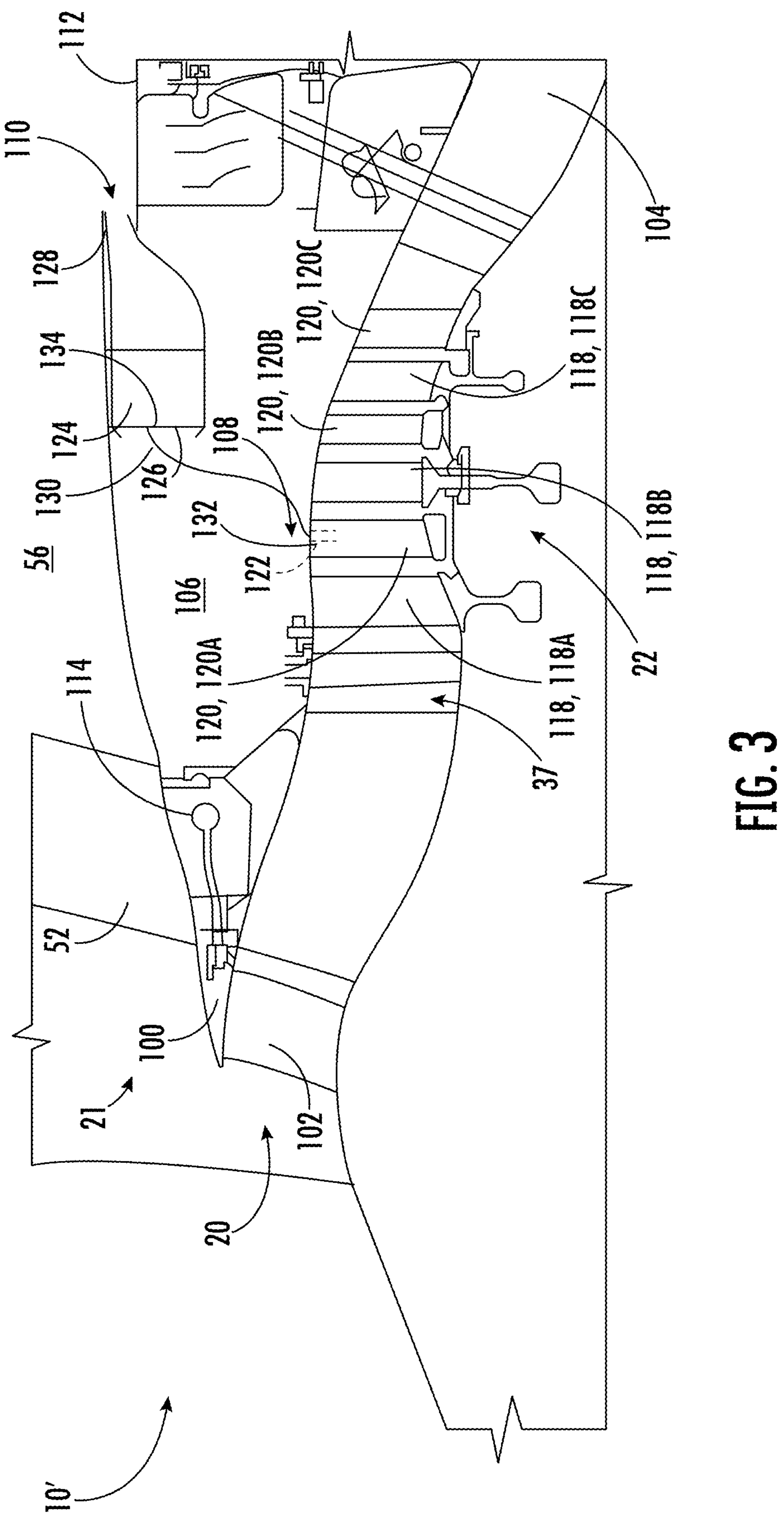
FIG. 3 is a schematic view of another turbomachine of the gas turbine engine of FIG. 1.

Referring now to FIG. 3, another exemplary embodiment of a turbofan engine 10' is shown. It will be appreciated that components in FIG. 3 that are similar in construction or function to those in FIG. 2 will share a same numeral, and description of such components with regard to FIG. 2 will also apply to those components in FIG. 3.

The turbofan engine 10' includes a duct 130 that extends from a booster 116 to an inlet 126 of a heat exchanger 124 in a cavity 106. More specifically, the duct 130 has a first end 132 disposed in a working gas flowpath 37 and a second end 134 attached to the inlet 126 of the heat exchanger 124. By incorporating the duct 130, air from the working gas flowpath 37 flows directly into the heat exchanger 124, rather than mixing with air present in the cavity 106 first. The duct 130 may be any suitable fluid connection, such as a flexible tube, a rigid pipe, a passageway, or combinations thereof. The duct 130 may be connected to a vane 120, such as a first vane 120A, to provide the air from the working gas flowpath 37 to the heat exchanger 124.

Figure 4:
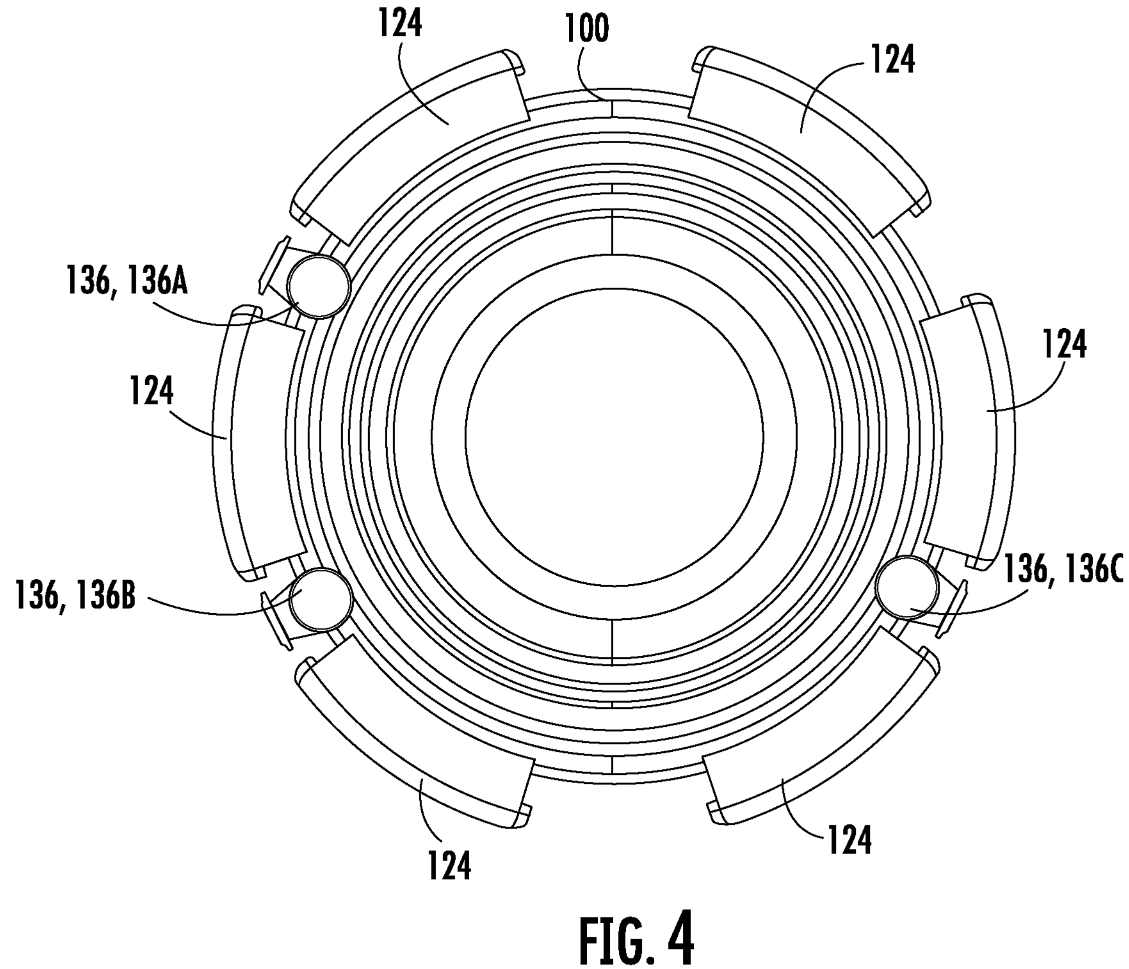
FIG. 4 is a schematic view of a heat exchanger assembly in accordance with an exemplary embodiment of the present disclosure.

With reference to FIG. 4, a rear view of the turbofan engine 10 is shown. It will be appreciated that components in FIG. 4 that are similar in construction or function to those in FIG. 2 will share a same numeral, and description of such components with regard to FIG. 2 will also apply to those components in FIG. 4.

FIG. 4 shows a plurality of heat exchangers 124 arranged circumferentially around the booster 116. By arranging the heat exchangers 124 circumferentially, the heat exchangers 124 can provide cooling to one or more accessory systems disposed at different circumferential positions in the gas turbine engine. The exemplary embodiment of FIG. 4 shows six heat exchangers 124, and it will be appreciated that the turbofan engine 10 may include a different number of heat exchangers 124.

The turbofan engine 10 includes at least one thermal control 136. In this context, a "thermal control" is a system that provides active heating, cooling, or both to a specific component in the gas turbine engine. For example, the thermal control 136 may be a turbine active clearance control system configured to provide an airflow, such as a cooling airflow, to an outer case of a turbine (e.g., an HP turbine 28 or an LP turbine 30) during certain operations to control a thermal expansion of the outer case of the turbine, and in turn control a clearance between stages of rotor blades within the turbine and the outer case. Other thermal control systems include, but are not limited to, compartment cooling systems, ventilation systems, and engine component cooling systems.

The thermal control 136 may be in fluid communication with at least one of the heat exchangers 124 to provide active cooling. FIG. 4 shows three thermal controls 136: one thermal control 136A that provides cooling to the HP turbine 28 (a "high pressure turbine thermal control") one thermal control 136B that provides cooling to the LP turbine 30 (a "low pressure turbine thermal control"), and one thermal control 136C that provides cooling to a core compartment, such as a portion of the core cowl 112 (a "core compartment clearance control").

Figure 5:
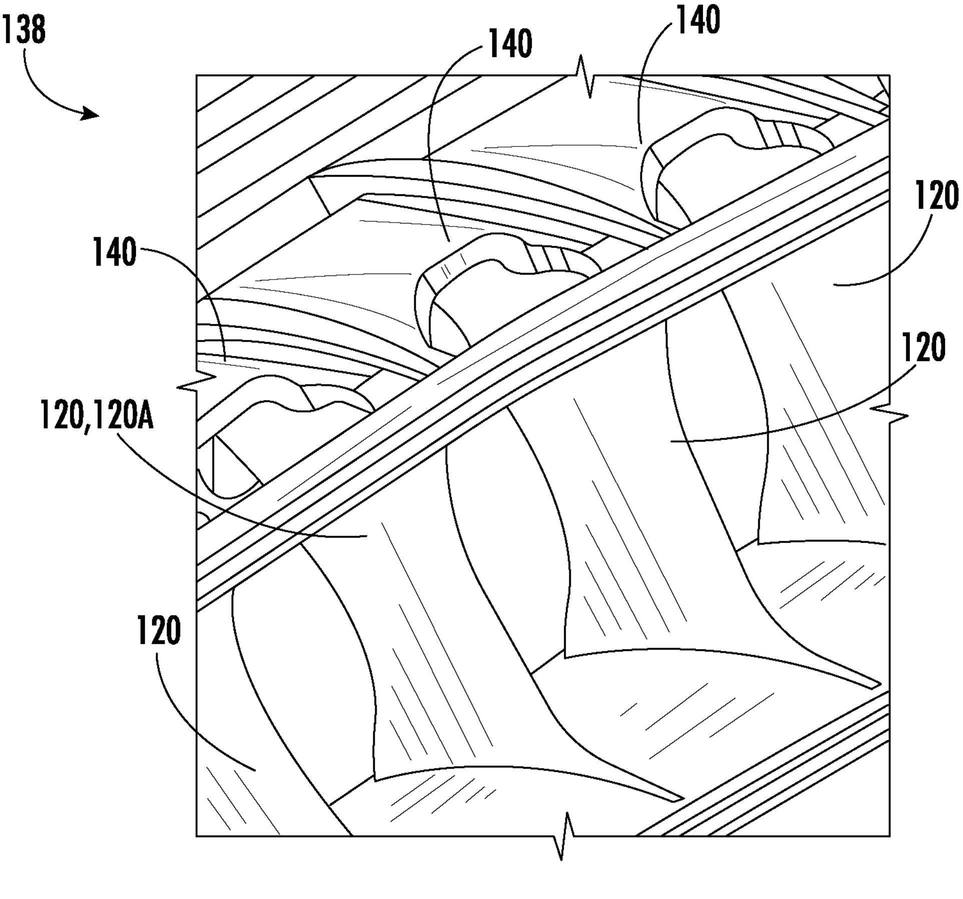
FIG. 5 is a perspective view of a vane assembly in accordance with an exemplary embodiment of the present disclosure.

Now referring to FIG. 5, a perspective view of a vane assembly 138 of the booster 116 is shown. Specifically, the first vane 120A shown in FIGS. 2-3 is included in the vane assembly of FIG. 5. That is, while FIGS. 2-3 show a single first vane 120A, it will be appreciated that the vane assembly 138 includes a plurality of vanes 120 that act as the first vane 120A, i.e., providing guidance for air in the working gas flowpath 37 from the first booster rotor blade 118A to the second booster rotor blade 118B.

Each of the plurality of vanes 120 of the vane assembly 138 includes a scoop 140. The scoop 140 is a structure that directs air from the working gas flowpath 37 into the cavity 106. That is, the scoop 140 fluidly connects the working gas flowpath 37 to the cavity 106 to provide air to the cavity 106 and the heat exchanger. The scoop 140 may have a generally arcuate shape that extends outward in the radial direction R and aft in the axial direction A. The arcuate shape helps guide air outward from the working gas flowpath 37 and into the cavity 106 by providing a path for the air to flow into the cavity 106 without disruptions to the flow from sharp edges or rearward-facing surfaces.

Further aspects are provided by the subject matter of the following clauses:

A gas turbine engine defines a radial direction and an axial direction, the gas turbine engine including a fan, a turbomachine drivingly coupled to the fan and including a compressor section, a combustion section, and a turbine section arranged in serial flow order and defining in part a working gas flowpath, the compressor section including a frame and defining a cavity forward of the frame in the axial direction, the compressor section further including a booster disposed in the working gas flowpath, the booster including a vane in fluid communication with the working gas flowpath and in fluid communication with the cavity, the gas turbine engine defining a bypass passage over the turbomachine, and a heat exchanger disposed at least partially in the cavity. The heat exchanger is in fluid communication with the booster in the working gas flowpath and is in fluid communication with the bypass passage.

The gas turbine engine of any of the preceding clauses, wherein the vane defines an opening fluidly connecting the working gas flowpath to the cavity.

The gas turbine engine of any of the preceding clauses, wherein the frame further includes a cavity inlet fluidly connecting the working gas flowpath and the cavity and a cavity outlet fluidly connecting the working gas flowpath and the bypass passage.

The gas turbine engine of any of the preceding clauses, wherein the heat exchanger includes an exit in fluid communication with the cavity outlet.

The gas turbine engine of any of the preceding clauses, wherein the vane is in fluid communication with the cavity inlet.

The gas turbine engine of any of the preceding clauses, wherein the vane includes a scoop fluidly connecting the working gas flowpath to the cavity.

The gas turbine engine of any of the preceding clauses, wherein the scoop extends outward in the radial direction and rearward in the axial direction.

The gas turbine engine of any of the preceding clauses, wherein the booster includes a first booster rotor blade and a second booster rotor blade, and the vane is disposed between the first booster rotor blade and the second booster rotor blade.

The gas turbine engine of any of the preceding clauses, further including a duct having a first end disposed in the working gas flowpath and a second end attached to the heat exchanger.

The gas turbine engine of any of the preceding clauses, wherein the first end of the duct is connected to the vane of the booster.

The gas turbine engine of any of the preceding clauses, further including a thermal control in thermal communication with the heat exchanger.

The gas turbine engine of any of the preceding clauses, wherein the thermal control is one of a high pressure turbine active clearance control or a low pressure turbine thermal control.

The gas turbine engine of any of the preceding clauses, wherein the heat exchanger is one of an air-cooled oil cooler or a variable frequency generator air-cooled oil cooler.

The gas turbine engine of any of the preceding clauses, wherein the booster is a low pressure compressor.

The gas turbine engine of any of the preceding clauses, wherein the booster is a multi-stage booster.

The gas turbine engine of any of the preceding clauses, further including a plurality of heat exchangers disposed circumferentially around the booster, wherein the heat exchanger is a first heat exchanger of the plurality of heat exchangers.

The gas turbine engine of any of the preceding clauses, further including a core cowl, wherein the heat exchanger is disposed forward of the core cowl in the axial direction.

The gas turbine engine of any of the preceding clauses, wherein the fan includes an outlet guide vane, and the heat exchanger is disposed aft of the outlet guide vane in the axial direction.

The gas turbine engine of any of the preceding clauses, wherein the heat exchanger is in fluid communication with the booster.

The gas turbine engine of any of the preceding clauses, wherein the fan is a single stage fan.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and an axial direction, the gas turbine engine comprising:

a fan;

a turbomachine drivingly coupled to the fan and comprising a compressor section, a combustion section, and a turbine section arranged in serial flow order and defining, in part, a working gas flowpath, the compressor section including a frame and defining a cavity forward of the frame in the axial direction, the compressor section further comprising a booster disposed in the working gas flowpath, the booster including a vane in fluid communication with the working gas flowpath and in fluid communication with the cavity, the gas turbine engine defining a bypass passage over the turbomachine; and a heat exchanger disposed at least partially in the cavity aft of the booster, the heat exchanger having an inlet disposed in the cavity and receiving air from the cavity and an exit extending out to the bypass passage, wherein the heat exchanger is in fluid communication with the booster in the working gas flowpath and is in fluid communication with the bypass passage.

2. The gas turbine engine of claim 1, wherein the vane defines an opening fluidly connecting the working gas flowpath to the cavity.

3. The gas turbine engine of claim 1, wherein the frame further comprises:

a cavity inlet fluidly connecting the working gas flowpath and the cavity; and a cavity outlet fluidly connecting the cavity and the bypass passage.

4. The gas turbine engine of claim 3, wherein the the exit is in fluid communication with the cavity outlet.

5. The gas turbine engine of claim 3, wherein the vane is in fluid communication with the cavity inlet.

6. The gas turbine engine of claim 1, wherein the vane includes a scoop fluidly connecting the working gas flowpath to the cavity.

7. The gas turbine engine of claim 6, wherein the scoop extends outward in the radial direction and rearward in the axial direction.

8. The gas turbine engine of claim 1, wherein the booster includes a first booster rotor blade and a second booster rotor blade, and the vane is disposed between the first booster rotor blade and the second booster rotor blade.

9. The gas turbine engine of claim 1, further comprising a duct having a first end disposed in the working gas flowpath and a second end coupled to the heat exchanger, wherein the inlet of the heat exchanger receives the air from the cavity and air from the second end of the duct.

10. The gas turbine engine of claim 9, wherein the first end of the duct is connected to the vane of the booster.

11. The gas turbine engine of claim 1, further comprising a thermal control in thermal communication with the heat exchanger.

12. The gas turbine engine of claim 11, wherein the thermal control is one of a high pressure turbine thermal control or a low pressure turbine thermal control.

13. The gas turbine engine of claim 1, wherein the heat exchanger is one of an air-cooled oil cooler or a variable frequency generator air-cooled oil cooler.

14. The gas turbine engine of claim 1, wherein the booster is a low pressure compressor.

15. The gas turbine engine of claim 1, wherein the booster is a multi-stage booster.

16. The gas turbine engine of claim 1, further comprising a plurality of heat exchangers disposed circumferentially around the booster, wherein the heat exchanger is a first heat exchanger of the plurality of heat exchangers.

17. The gas turbine engine of claim 1, further comprising a core cowl, wherein the heat exchanger is disposed forward of the core cowl in the axial direction.

18. The gas turbine engine of claim 1, wherein the fan includes an outlet guide vane, and the heat exchanger is disposed aft of the outlet guide vane in the axial direction.

19. The gas turbine engine of claim 1, wherein the heat exchanger is in fluid communication with the booster.

20. The gas turbine engine of claim 1, wherein the fan is a single stage fan.

* * * * *